US012809550B2

(12) United States Patent
Yang et al.

(10) Patent No.: US 12,809,550 B2
(45) Date of Patent: Nov. 24, 2026

(54) SOLID-STATE DRIVE WITH HIGH-SPEED DATA BUFFERING

(71) Applicant: Microchip Technology Incorporated, Chandler, AZ (US)

(72) Inventors: Nian Niles Yang, Mountain View, CA (US); Pitamber Shukla, San Jose, CA (US); Hichem Belhadj Mohamed, Loomis, CA (US); Timothy James Symons, Anmore (CA)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 19/075,388

(22) Filed: Mar. 10, 2025

(65) Prior Publication Data

US 2026/0050397 A1 Feb. 19, 2026

Related U.S. Application Data

(60) Provisional application No. 63/684,455, filed on Aug. 19, 2024.

(51) Int. Cl.
*G06F 3/06* (2006.01)

(52) U.S. Cl.
CPC .......... *G06F 3/0656* (2013.01); *G06F 3/0611* (2013.01); *G06F 3/064* (2013.01); *G06F 3/0659* (2013.01); *G06F 3/0679* (2013.01)

(58) Field of Classification Search
CPC ...... G06F 3/0656; G06F 3/0611; G06F 3/064; G06F 3/0659; G06F 3/0679; G06F 3/061; G06F 3/0644; G06F 3/0688; G06F 2212/7201; G06F 2212/7202; G06F 12/0246
See application file for complete search history.

(56) References Cited

U.S. PATENT DOCUMENTS

| | | | | |
|---|---|---|---|---|
| 11,081,180 B2 * | 8/2021 | Yang | .................. | G06F 11/1072 |
| 2009/0175081 A1 | 7/2009 | Kim | | |
| 2013/0258772 A1 | 10/2013 | Lee et al. | | |
| 2018/0336948 A1 * | 11/2018 | Luo | ..................... | G11C 7/1039 |

OTHER PUBLICATIONS

International Search Report and Written Opinion for PCT Application No. PCT/US2025/019206 (Dated May 30, 2025).

* cited by examiner

*Primary Examiner* — Jae U Yu
(74) *Attorney, Agent, or Firm* — Hovey Williams LLP

(57) ABSTRACT

A solid-state drive with high-speed data buffering, and a method of implementing high-speed data buffering in a solid-state drive. Blocks of non-volatile memory media are categorized into speed categories based on their proximity to a decoding and sensing circuitry of a controller, in which closer blocks are faster than farther blocks. Each block is divided into wordline and bitline speed segments based on their proximity to the same circuitry, in which closer segments are faster than farther segments. Data is received, mapped to a particular speed segment of a particular block based on a speed requirement for accessing the data, and stored in the particular speed segment. A map of the blocks and segments may be created based on their access speeds. A memory register containing an access parameter for each speed segment may be changed to match a ramp rate of the speed segment.

20 Claims, 7 Drawing Sheets

SOLID-STATE DRIVE WITH HIGH-SPEED DATA BUFFERING

RELATED APPLICATION

The present U.S. non-provisional patent application is related to and claims priority benefit of an earlier-filed U.S. provisional patent application titled "Solid-State Drive with High-speed Data Buffering," Ser. No. 63/684,455, filed Aug. 19, 2024. The entire content of the identified earlier-filed application is incorporated by reference as if fully set forth herein.

FIELD

The present disclosure relates to solid-state drives and methods of implementing them, and more particularly, the various examples described herein concern a solid-state drive with high-speed data buffering, and a method of implementing high-speed data buffering in a solid-state drive.

BACKGROUND

Solid-state drives (SSD) use non-volatile memory (NVM) media (e.g., NAND-based memory media) for data storage, and typically include application-specific integrated circuit (ASIC) controllers for managing read, write, and other operations. SSDs are typically used in enterprise computing data center solutions (DCS) and certain high-performance computing (HPC) applications, including artificial intelligence (AI). It is generally desirable to improve the performance and reduce the cost of SSDs, but it can be difficult to do so.

This background discussion is intended to provide related information, and is not necessarily prior art.

SUMMARY

Examples provide an SSD with high-speed data buffering, and a method of implementing high-speed data buffering in an SSD. Broadly, examples enable existing NAND-based SSDs to access data at higher speeds and are particularly useful in high-speed data storage environments in which SSD performance must be sufficient to buffer data for synchronous dynamic random-access memory (SDRAM). Examples advantageously provide a practical process for increasing the speed of SSDs while maintaining high capacity, without the need for a new type of expensive NAND and without adding overhead or adversely impacting the system and host performance. Further, examples advantageously increase value and enhance end-user experiences through, e.g., reduced data access latency and more accurate data availability expectation.

In an example, of a method of implementing high-speed data buffering in an SSD may include the operations set forth below. The SSD may include a controller and an NVM media. A plurality of memory blocks of the NVM media may be categorized into a plurality of speed categories, wherein a first memory block that is closer to a decoding and sensing circuitry of the controller is faster than a another memory block that is physically farther from the decoding and sensing circuitry. Each memory block may be divided into a plurality of speed segments, wherein a first speed segment that is closer to the decoding and sensing circuitry is faster than a second speed segment that is farther from the decoding and sensing circuitry. Particular data may be received from a host for writing by the controller to the NVM media, the particular data may be mapped to a particular speed segment of a particular memory block based on a speed/latency requirement for accessing the data, and the particular data may be stored in the particular speed segment of the particular memory block.

The preceding example may further include any one or more of the following features. The NVM media may be a NAND-based memory media. The plurality of speed segments may include a plurality of wordline segments. The data write command for the particular data may be issued by the controller for an individual wordline segment of the plurality of wordline segments, and the individual wordline segment may not be entirely written as a result of the data write command. The plurality of speed segments may include a plurality of bitline segments. The operations of the method may further include creating a map of the plurality of memory blocks based on the plurality of speed categories and of the plurality of segments of each memory block based on the plurality of speed segments, and storing the map in a controller memory for access when the particular data is received from the host for writing. The first speed segment that is closer to the decoding and sensing circuitry may have a higher ramp rate than a second speed segment that is farther from the decoding and sensing circuitry. The operations of the method may further include changing a memory register containing an access parameter for each speed segment of each memory block to match a ramp rate of the speed segment.

In another example, an SSD with high-speed data buffering may include an NVM media and a controller. The NVM media may be configured to store data. The controller may be configured to perform the following functions. A plurality of memory blocks of the NVM media may be categorized into a plurality of speed categories, wherein a first memory block that is closer to a decoding and sensing circuitry of the controller is faster than a second memory block that is farther from the decoding and sensing circuitry. Each memory block may be divided into a plurality of speed segments, wherein a first speed segment that is closer to the decoding and sensing circuitry is faster than a second speed segment that is farther from the decoding and sensing circuitry. Particular data may be received from a host for writing by the controller to the NVM media, the particular data may be mapped to a particular speed segment of a particular memory block based on a speed requirement for accessing the data, and the particular data may be stored in the particular speed segment of the particular memory block.

The preceding examples may further include any one or more of the following features (if not already recited). The NVM media may be a NAND-based memory media. The plurality of speed segments may include a plurality of wordline segments. The data write command for the particular data may be issued by the controller for an individual wordline segment of the plurality of wordline segments, and the individual wordline segment may not be entirely written as a result of the data write command. The plurality of speed segments may include a plurality of bitline segments. The plurality of functions performed by the controller may further include creating a map of the plurality of memory blocks based on the plurality of speed categories and of the plurality of segments of each memory block based on the plurality of speed segments, and storing the map in a controller memory for access when the particular data is received from the host for writing. The first speed segment that is closer to the decoding and sensing circuitry may have a higher ramp rate than a second speed segment that is farther from the decoding and sensing circuitry. The plurality of functions performed by the controller may further include changing a memory register containing an access parameter for each speed segment of each memory block to match a ramp rate of the speed segment.

This summary is not intended to identify essential features of the examples, and is not intended to be used to limit the scope of the claims. These and other aspects of the present examples are described below in greater detail.

DRAWINGS

Examples are described in detail below with reference to the attached drawing figures, wherein.

Figure 1:
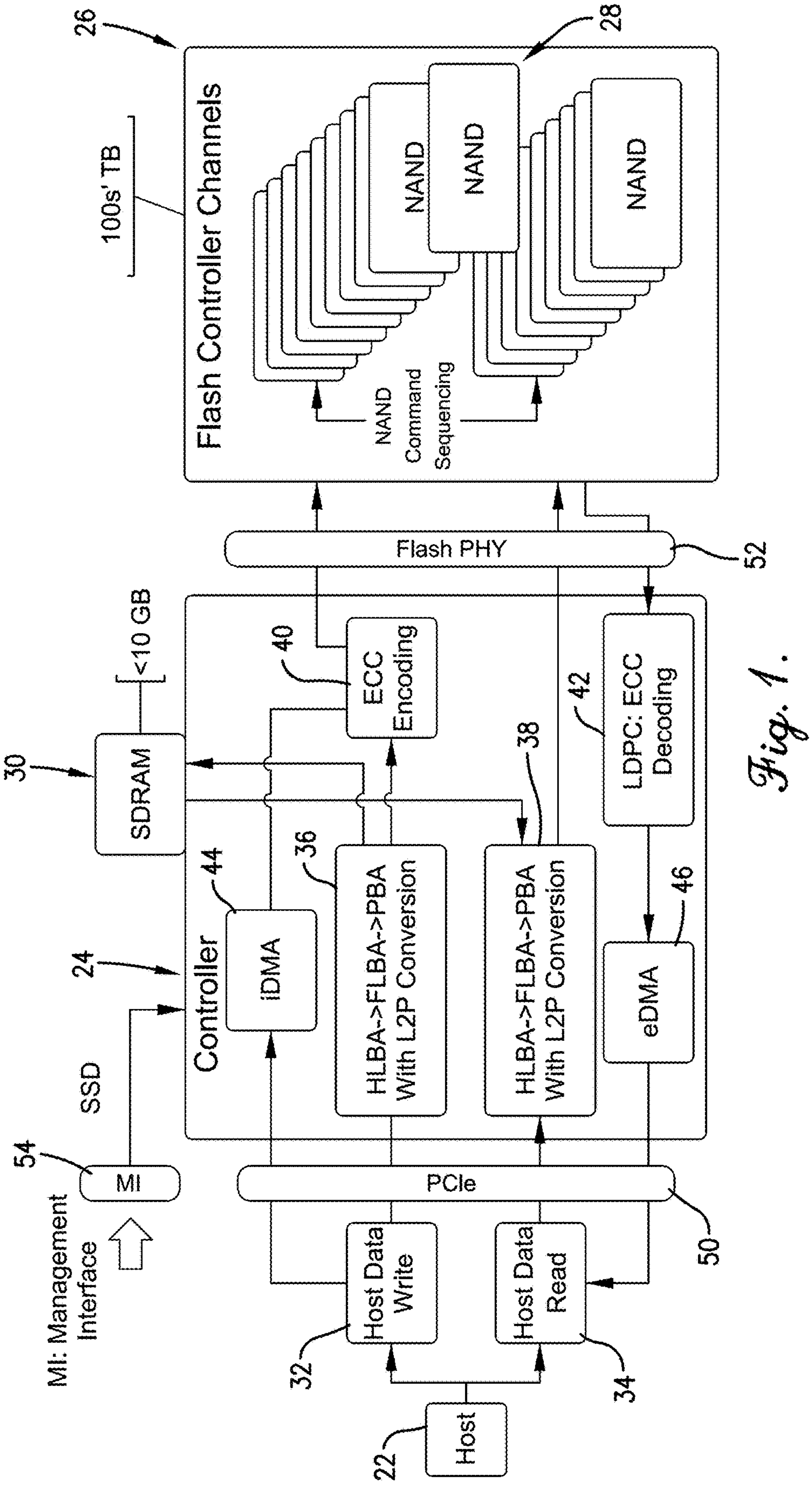
FIG. 1 is a high-level block diagram of components and operations of an SSD with high-speed data buffering.

The figures are not intended to limit the examples to the specific details depict. The drawings are not necessarily to scale.

DETAILED DESCRIPTION

In the following detailed description, reference is made to the accompanying drawings, which form a part hereof and in which are shown, by way of illustration, specific examples in which the present disclosure may be practiced. These examples are described in sufficient detail to enable a person of ordinary skill in the art to practice the present disclosure. However, other examples may be utilized, and structural, material, procedural, operational, and other changes may be made without departing from the scope of the disclosure. Unless clearly understood or expressly identified otherwise, structures, materials, procedures, operations, and other aspects described in the context of one example may be incorporated into other examples.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, any similarity in numbering does not necessarily mean that the structures or components are necessarily identical in size, composition, configuration, or any other property.

Terms of relative location and direction (e.g., above, below, left, right, upper, lower) may be used to facilitate the present descriptions of examples with reference to the figures, but unless clearly understood or expressly identified otherwise, these terms are not meant to be limiting with regard to location, direction, or overall orientation, and may, for example, change as a result of a change in overall orientation.

It will be readily understood that the components of the examples as generally described herein and illustrated in the drawings could be arranged and designed in a wide variety of different configurations. Thus, the following description of various examples is not intended to limit the scope of the present disclosure but is merely representative of various examples.

Examples provide an SSD with high-speed data buffering, and a method of implementing high-speed data buffering in an SSD. More specifically, examples enable existing NAND-based SSDs to access data at higher speeds and are particularly useful in high-speed data storage environments in which it may be desirable that SSD performance be sufficient to buffer data for SDRAM. Examples advantageously provide a practical process for increasing the speed of SSDs while maintaining high capacity, without the need for a new type of expensive NAND and without adding overhead or adversely impacting the system and host performance. Further, examples advantageously increase value and enhance end-user experiences through, e.g., reduced data access latency and more accurate data availability expectation.

Conventionally, operations are delayed until an entire wordline reaches its full biasing level before writing to or reading from that wordline. Examples of the present disclosure identify and select segments of wordlines and bitlines that experience faster bias ramping, and then write to and read from those particular segments while other segments of the same wordlines and bitlines have not yet reached their full biasing level. Examples may be used in single-level cell (SLC) systems as SDRAM buffering for persistent data storage, but can also be used in higher-level cell (e.g., triple-level cell (TLC), quadruple-level cell (QLC)) systems. Applications include enterprise computing (DCS) and certain high-performance computing (HPC) applications, including artificial intelligence (AI).

Referring to FIG. 1, a high-level block diagram of components, operations, and an operating context of an SSD 20 is shown including a host 22 configured to write and read data to and from the SSD 20; a controller 24 configured to control various SSD operations, such as those discussed below; and an NVM media 26, such as a NAND-based memory media in the form of a plurality of NAND dies 28. Each NAND die may include one or more planes, each plane may include multiple blocks, each block may include multiple pages, and each page may include multiple cells. Each block may be arranged as an array of wordlines (WLs) and bitlines (BLs), with each WL representing a page. Although described herein with regard to NAND-based memory media, examples may employ substantially any suitable memory array technology, such as NOR-based memory media and dynamic random access memory (DRAM).

Generally, the SSD 20 may operate as follows. A write or read request may be received from the host 22 via a peripheral component interconnect express (PCIe) or other suitable interface 50. PCIe is a standardized interface for motherboard components. The controller 24 may use logical block addresses (LBAs) and physical block addresses (PBAs) to facilitate access for data storage in and retrieval from the NVM 26. LBAs are an abstraction to allow the operating system to interact with the NVM 26, and PBAs represent the actual hardware locations within the NVM 26.

To facilitate interacting with the NVM 26, the controller 24 may create an entry or record that assigns an LBA to a PBA. To keep track of all such LBA-to-PBA assignments, the controller 24 may use a logical-to-physical (L2P) mapping table. The L2P table may be uploaded to synchronous dynamic random access memory (SDRAM) 30 so that it can be more quickly accessed and updated by the controller 24. When a write or read data request 32, 34 is received from the host 22, the controller 24 performs a reference operation 36, 38 to the L2P mapping table to determine the PBA within the NVM corresponding to a desired LBA. Once the PBA is determined, the controller 24 accesses the appropriate NVM cell to write or read the data. Access to the NVM 26 may be via a flash physical (PHY) or other suitable interface 52. The controller 24 may employ an error correction code (ECC) operation 40, 42 during encoding and decoding of data to detect and correct errors and enhance data integrity. Additionally, the SSD 20 may support a direct memory access (DMA) operation 44, 46 enabling data to be written from the host 22 directly to the NVM 26 and read from the NVM 26 directly to the host 22. Certain commands, such as the disablement commands described herein, may be issued to the controller 24 using the host command layer, or non-volatile memory express management (NVMe-MI) or other suitable interface 54.

Figure 2:
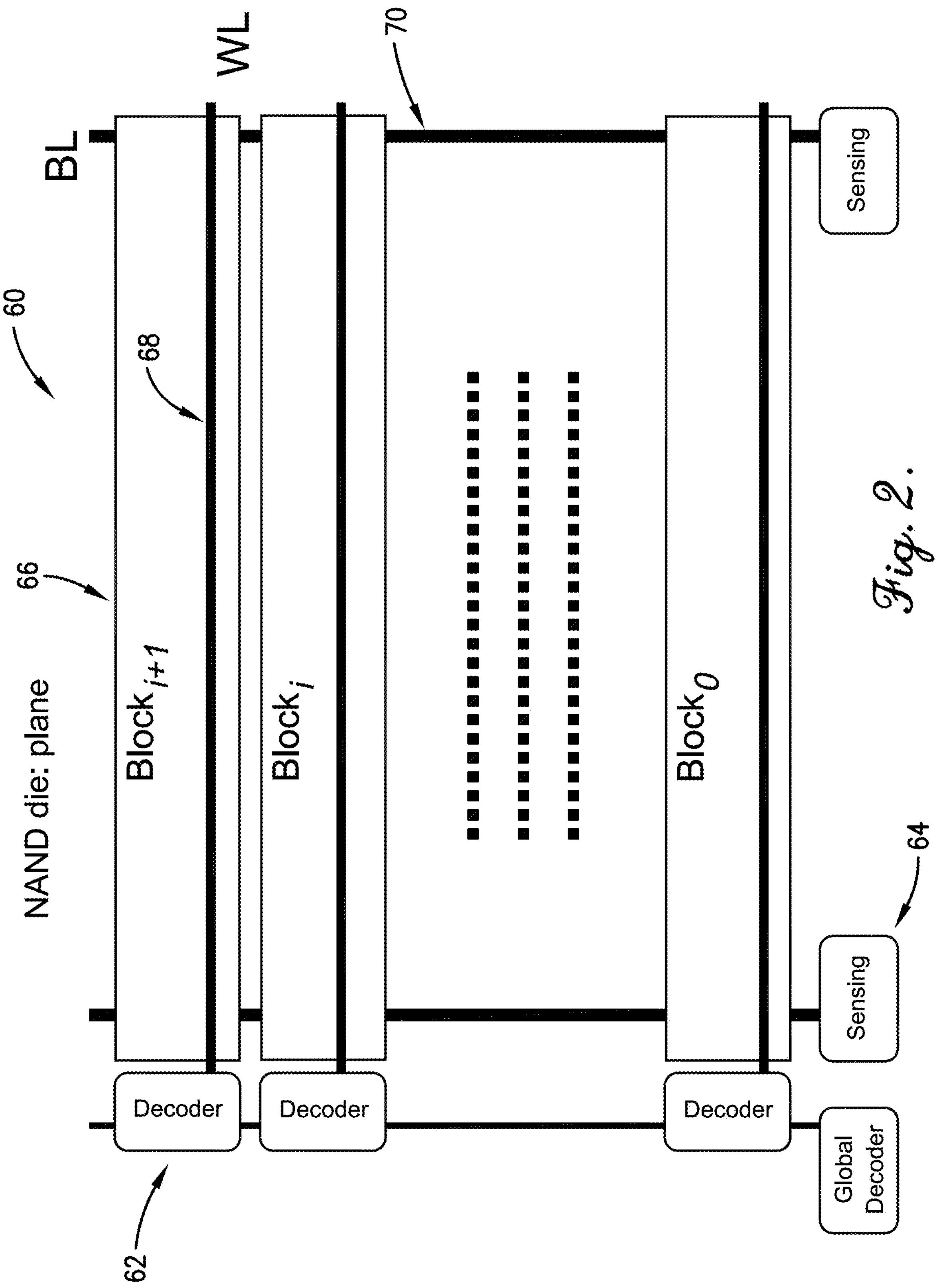
FIG. 2 is a high-level depiction of a NAND plane, including decoding and sensing circuitry, wordlines, and bitlines
Figure 3A:
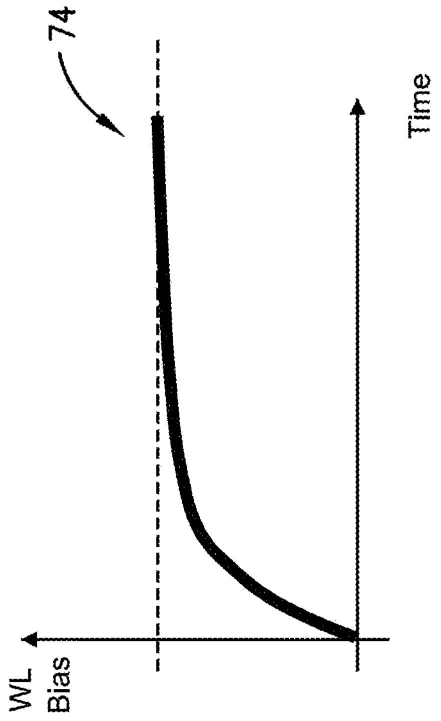
FIG. 3A is graph of wordline bias versus time.
Figure 3B:
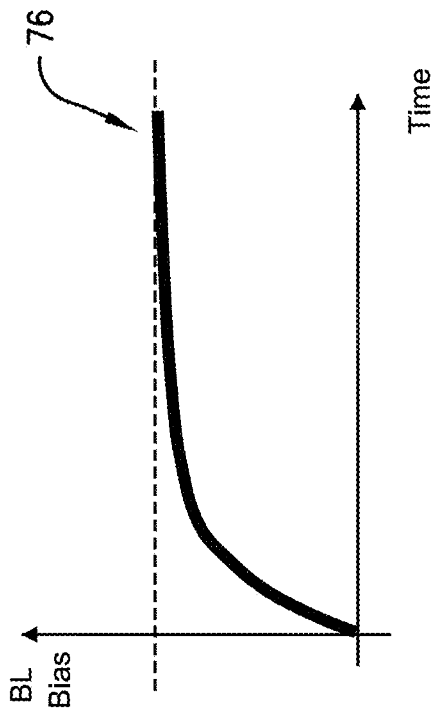
FIG. 3B is a graph of bitline bias versus time.

Referring also to FIG. 2, a high-level depiction of a NAND plane 60 within the NVM media 26 is shown, including decoding and sensing circuitry 62, 64, blocks 66, wordlines (WL) 68, and bitlines (BL) 70. FIG. 3A shows a graph 74 of WL bias versus time, and FIG. 3B shows a graph 76 of BL bias versus time. A NAND block 66 can be very large and may include, for example, three hundred or more three-dimensional WL layers, six subblocks, and various non-data WLs. BLs 70 can also be very long and span over the blocks 66 in the entire plane 60. A NAND block is typically programmed sequentially by the order of WL and subblocks within a given physical block. Conventionally, the speed of an operation, whether writing or reading, is limited by the WL and BL ramping rates, which are depicted in the graphs 74, 76. Examples of the present disclosure leverage the WL and BL ramping speeds in order to increase the operation speed.

Figure 4:
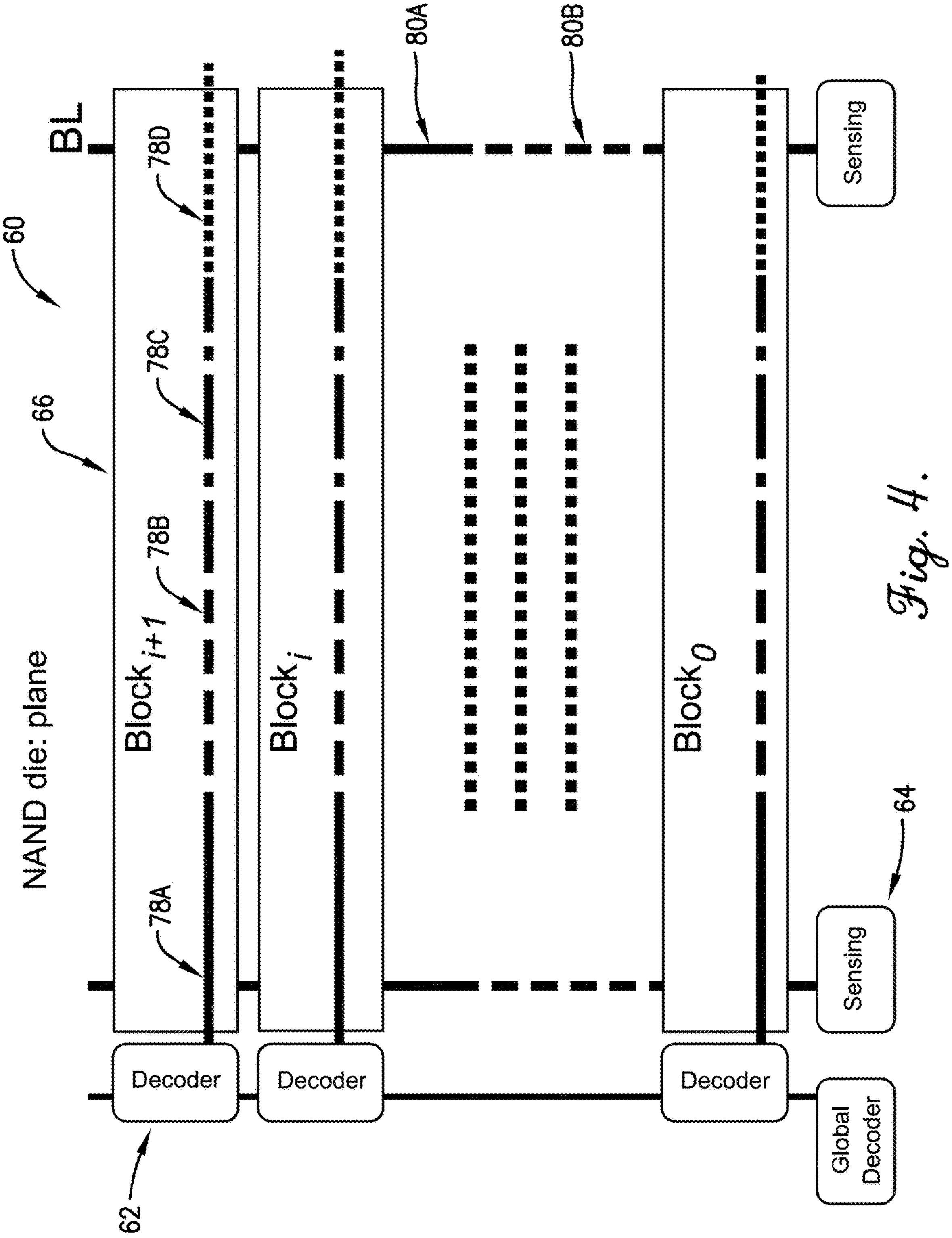
FIG. 4 is a high-level depiction of the NAND plane, including decoding and sensing circuitry, wordlines divided into regions, and bitlines divided into regions.
Figure 5:
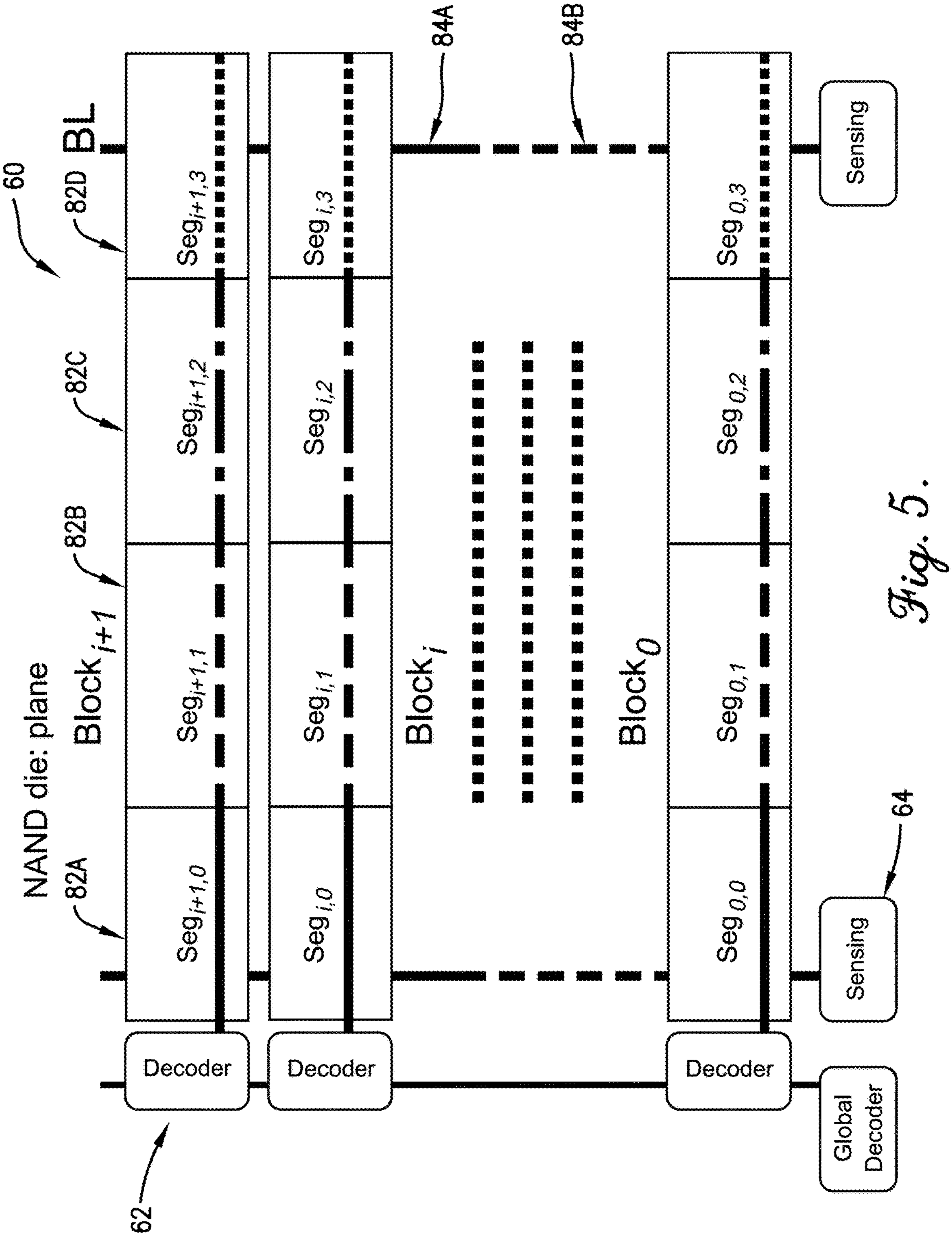
FIG. 5 is a high-level depiction of an example of the NAND plane in an SSD with high-speed data buffering, the NAND plane including decoding and sensing circuitry, wordline regions treated as segments, and bitline regions treated as segments
Figure 6A:
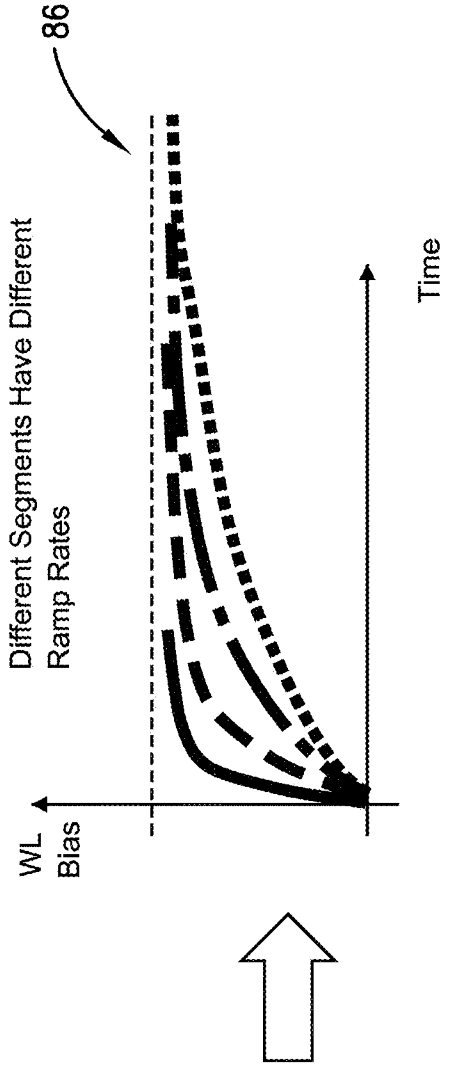
FIG. 6A is a graph of wordline segment bias versus time.
Figure 6B:
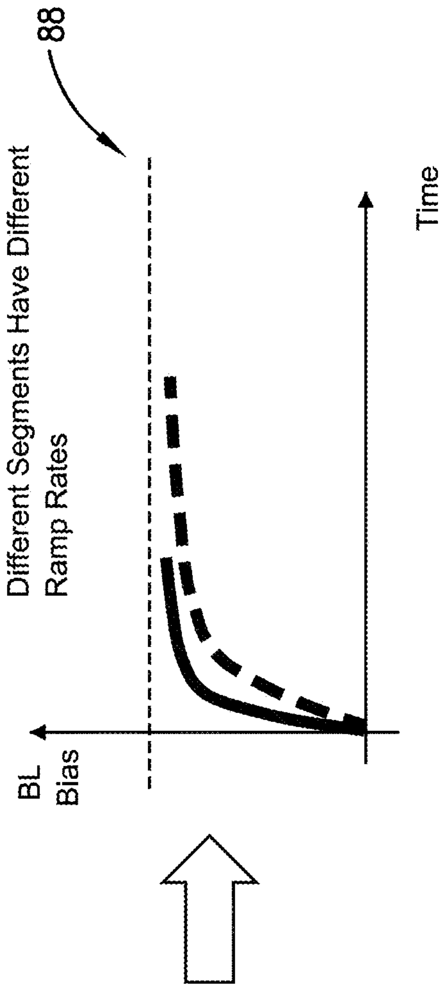
FIG. 6B is a graph of bitline segment bias versus time.

Referring also to FIG. 4, a high-level depiction of the NAND plane 60 is shown, including the WLs 68 divided into regions 78A, 78B, 78C, 78D, and the BLs 70 divided into regions 80A, 80B. Referring also to FIG. 5, a high level depiction of an example of the NAND plane 60 in the SSD 20 with high-speed data buffering, including WL regions treated as discrete segments 82A, 82*b*, 82C, 82D and BL regions treated as discrete segments 84A, 84B. FIG. 6A shows a graph 86 of WL segment bias versus time, and FIG. 6B shows a graph 88 of BL segment bias versus time. Examples use address segmentation to identify and select WL and BL segments with higher ramp rates to increase the speed of operations. Blocks 66 that are relatively physically closer to the decoding and sensing circuitry 52, 54 may be designated for high-speed purposes. Approximately between five percent (5%) and fifteen percent (10%), or approximately ten percent (10%), of the NAND capacity that is closer to the sensing circuitry 52, 54 may be so designated. For a one-hundred-twenty (128) terabyte (TB) drive, ten percent (10%) of the NAND capacity provides twelve (12) TB of fast access for SDRAM buffering. The first one-quarter or one-half of the SLC physical WL 68 that is physically closer to the decoding and sensing circuitry 52, 54 can have a faster WL/BL ramp rate than the rest of the WL/BL. Examples may choose a particular segment of a physical WL 68 that can be programmed relatively faster, i.e., the write operation is completed in a relatively shorter period of time, than other segments of the same WL 68. When the controller 24 is instructed to or otherwise determines to write data to the NVM 26 with high-speed, it places the data in these particular segments, i.e., where the WL/BL ramping is faster. The ramping of the WL and BL is resistor/capacitor (R/C) dependent, so the shorter R/C region of the WL/BL may be used for faster data storage. More specifically, high voltage is applied to WLs to sense the memory cells, so longer WLs result in a longer R/C delay to stabilize before reading the memory cells. Using the segments closer to the decoding and sensing circuitry results in shorter WLs and shorter delays. At the same time, for these faster portions, NAND trim with a lower biasing level may be used. For example, if the SLC WL is sixteen (16) kilobytes (KB), then the first four (4) KB or eight (8) KB may be used for high-speed operations. The controller 24 may update the L2P map to re-map the LBA to the PBA that corresponds physically to these partial WLs. This process can identify selected blocks throughout the entire population of blocks in the SSD 20, can grade speed needs accordingly, and can map to the blocks that can have different BL locations that match the speed on the RC. Thus, without changing the NAND structure, examples use the SSD controller 24 to re-address the NAND in order to increase the operation speed.

The host 22 and the controller 24 may cooperate to identify data to be written or read quickly. For example, if the data is from high bandwidth memory (HBM) (which is widely used by AI systems), then they are likely higher speed data. If the data is from regular dynamic random access memory (DRAM) or hard disk drive (HDD)/SDD in the lower hierarchy of the storage stack of the system, then they are likely lower speed data. Some or all of the functions of the SSD 20 may be reflected in the operations of the method 120 described below.

Figure 7:
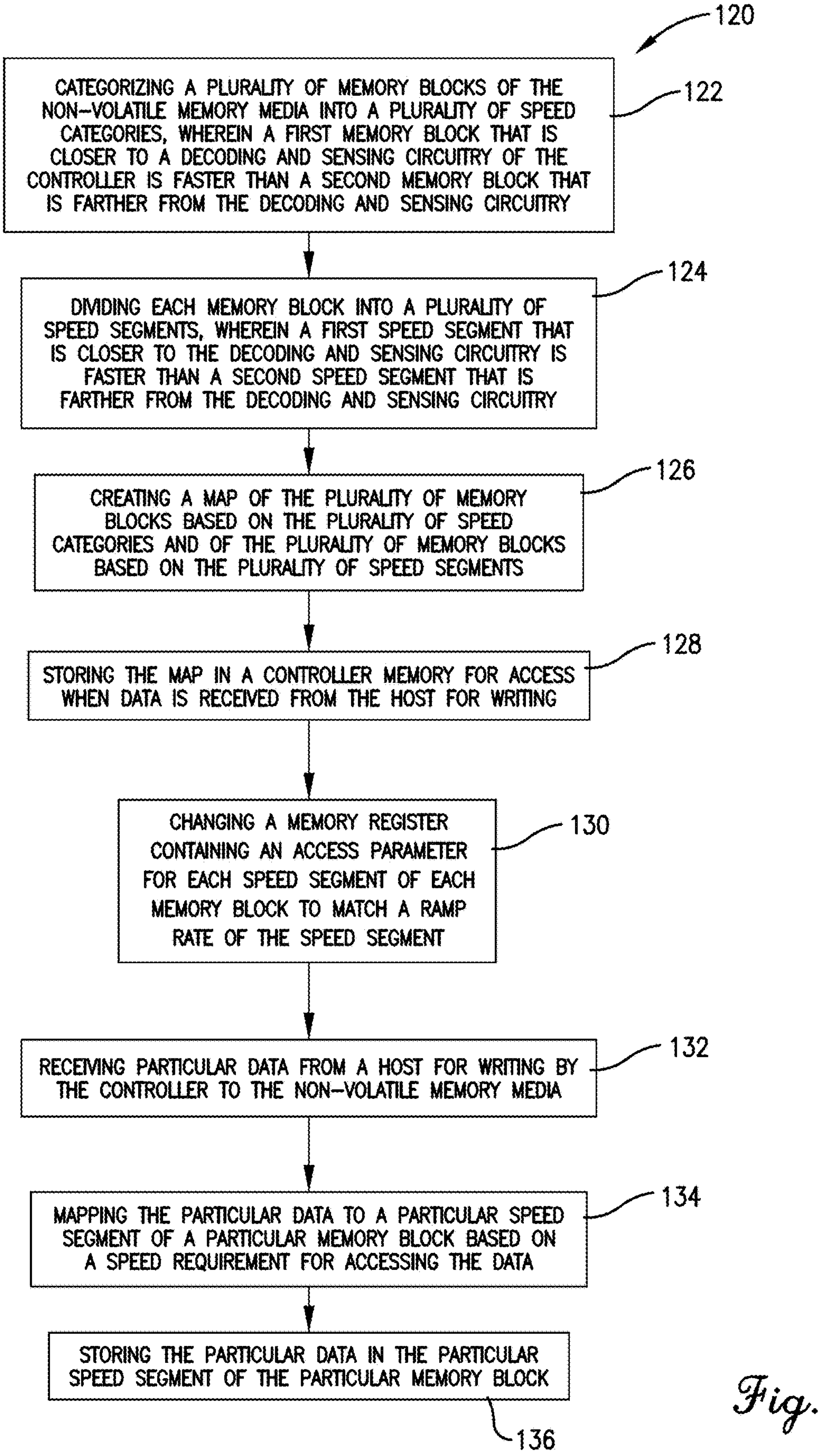
FIG. 7 is a flowchart of operations in an example of a method of implementing high-speed data buffering in an SSD.

Referring to FIG. 7, an example of a method 120 of implementing high-speed data buffering in an SSD 20 may include the operations set forth below. The SSD 20 may include a controller 24 a NAND-based or other NVM media 26. Some or all of the operations of the method 120 may be reflected the functions of the SSD 20 described above.

A plurality of memory blocks 66 of the NVM media 26 may be categorized into a plurality of different speed categories, wherein a first memory block that is closer to a decoding and sensing circuitry 52, 54 of the controller 24 is faster than a second memory block that is farther from the decoding and sensing circuitry 52, 54, as shown in 122. The NVM media 26 may be NAND-based memory media, and the memory blocks may be NAND blocks.

Each memory block 66 may be divided into a plurality of different speed segments, wherein a first speed segment that is closer to the decoding and sensing circuitry 52, 54 is faster than a second speed segment that is farther from the decoding and sensing circuitry 52, 54, as shown in 124. One or both of WLs 68 and BLs 70 of the block 66 may be divided into these speed segments and employed accordingly.

A map may be created for the plurality of memory blocks 66 based on the different speed categories, and for each WL segment 82A, 82B, 82C, 82D and BL segment 84A, 84B of each memory block 66 based on the different speed segments, as shown in 126. This allows for writing the data to appropriate locations based on desired access speeds, wherein data with higher speed requirements are placed in blocks and speed segments that are relatively physically closer to the decoding and sensing circuitry 52, 54 to allow for faster access. The map may be stored in a controller memory 30 for access when particular data is received from the host 22 for writing, as shown in 128. A memory register containing a write/read access parameter for each speed segment of each memory block 66 may be changed to match a WL and BL ramp rate of the speed segment, as shown in 130. This operation (i.e., 130), may alternatively or additionally occur one or more times elsewhere in the process. For example, a change to the memory register may occur whenever a particular set of parameters for a particular segment is adjusted. Thus, data requiring fast access can be programmed to faster speed regions, with faster NAND program settings to accommodate faster WL and BL ramping.

Particular data may be received from the host 22 for writing by the controller 24 to the NVM media 26, as shown in 132. The particular data may be mapped to a particular WL and BL speed segment 82A, 82B, 82C, 82D, 84A, 84B of a particular memory block 66 based on a speed requirement for accessing the data, as shown in 134. The particular data may be stored in the particular speed segment of the particular memory block 66, as shown in 136. A data write command for the particular data issued by the controller 24 for an individual WL segment may not result in the entire individual WL segment being written.

While the present disclosure has been described herein with respect to certain illustrated examples, those of ordinary skill in the art will recognize and appreciate that the present disclosure is not so limited. Rather, many additions, deletions, and modifications to the illustrated and described examples may be made without departing from the scope of the disclosure as hereinafter claimed along with their legal equivalents. In addition, features from one example may be combined with features of another example while still being encompassed within the scope of the disclosure as contemplated by the inventors.

The invention claimed is:

1. A method of implementing high-speed data buffering in a solid-state drive, the solid-state drive including a controller and a non-volatile memory media, the method comprising:
- categorizing a plurality of memory blocks of the non-volatile memory media into a plurality of speed categories, wherein a first memory block that is closer to a decoding and sensing circuitry of the controller is faster than a second memory block that is farther from the decoding and sensing circuitry;
- dividing each memory block of the plurality of memory blocks into a plurality of speed segments, wherein a first speed segment that is closer to the decoding and sensing circuitry is faster than a second speed segment that is farther from the decoding and sensing circuitry, and wherein the first speed segment that is closer to the decoding and sensing circuitry has a higher ramp rate than the second speed segment that is farther from the decoding and sensing circuitry;
- receiving particular data from a host for writing by the controller to the non-volatile memory media;
- mapping the particular data to a particular speed segment of a particular memory block based on a speed requirement for accessing the data; and
- storing the particular data in the particular speed segment of the particular memory block.

2. The method of claim 1, wherein the non-volatile memory media is a NAND-based memory media.

3. The method of claim 1, wherein the plurality of speed segments include a plurality of wordline segments.

4. The method of claim 3, wherein a data write command for the particular data is issued by the controller for an individual wordline segment of the plurality of wordline segments, and the individual wordline segment is not entirely written as a result of the data write command.

5. The method of claim 1, wherein the plurality of speed segments include a plurality of bitline segments.

6. The method of claim 1, further including—
- creating a map of the plurality of memory blocks based on the plurality of speed categories and of the plurality of segments of each memory block based on the plurality of speed segments; and
- storing the map in a controller memory for access when the particular data is received from the host for writing.

7. The method of claim 1, further including—
- changing a memory register containing an access parameter for each speed segment of each memory block to match a ramp rate of the speed segment.

8. A method of implementing high-speed data buffering in a solid-state drive, the solid-state drive including a controller and a NAND-based memory media, the method comprising:
- categorizing a plurality of NAND blocks of the NAND-based memory media into a plurality of speed categories, wherein a first NAND block that is closer to a decoding and sensing circuitry of the controller is faster than a second NAND block that is farther from the decoding and sensing circuitry;
- dividing each NAND block of the plurality of NAND blocks into a plurality of speed segments, wherein a first speed segment that is closer to the decoding and sensing circuitry is faster than a second speed segment that is farther from the decoding and sensing circuitry;
- creating a map of the plurality of NAND blocks based on the plurality of speed categories and of the plurality of NAND blocks based on the plurality of speed segments;
- storing the map in a controller memory for access when data is received from the host for writing;
- changing a NAND register containing an access parameter for each speed segment of each NAND block to match a ramp rate of the speed segment;
- receiving particular data from a host for writing by the controller to the NAND-based memory media;
- creating a map of the plurality of NAND blocks based on the plurality of speed categories and of the plurality of segments of each NAND block based on the plurality of speed segments; and
- storing the map in a controller memory for access when the particular data is received from the host for writing.

9. The method of claim 8, wherein the plurality of speed segments include a plurality of wordline segments.

10. The method of claim 8, wherein the plurality of speed segments include a plurality of bitline segments.

11. The method of claim 8, wherein a data write command for the particular data is issued by the controller for an individual wordline segment of the plurality of wordline segments, and the individual wordline segment is not entirely written as a result of the data write command.

12. A solid-state drive with high-speed data buffering, the solid-state drive comprising:
- a non-volatile memory media configured to store data; and
- a controller configured to perform a plurality of functions including—
  - categorizing a plurality of memory blocks of the non-volatile memory media into a plurality of speed categories, wherein a first memory block that is closer to a decoding and sensing circuitry of the controller is faster than a second memory block that is farther from the decoding and sensing circuitry;

dividing each memory block of the plurality of memory blocks into a plurality of speed segments, wherein a first speed segment that is closer to the decoding and sensing circuitry is faster than a second speed segment that is farther from the decoding and sensing circuitry, and wherein the first speed segment that is closer to the decoding and sensing circuitry has a higher ramp rate than the second speed segment that is farther from the decoding and sensing circuitry;

receiving particular data from a host for writing by the controller to the non-volatile memory media;

mapping the particular data to a particular speed segment of a particular memory block based on a speed requirement for accessing the data; and storing the particular data in the particular speed segment of the particular memory block.

13. The solid-state drive of claim 12, wherein the non-volatile memory media is a NAND-based memory media.

14. The solid-state drive of claim 12, wherein the plurality of speed segments include a plurality of wordline segments.

15. The solid-state drive of claim 14, wherein a data write command for the particular data is issued by the controller for an individual wordline segment of the plurality of wordline segments, and the individual wordline segment is not entirely written as a result of the data write command.

16. The solid-state drive of claim 12, wherein the plurality of speed segments include a plurality of bitline segments.

17. The solid-state drive of claim 12, the plurality of functions performed by the controller further including— creating a map of the plurality of memory blocks based on the plurality of speed categories and of the plurality of segments of each memory block based on the plurality of speed segments; and storing the map in a controller memory for access when the particular data is received from the host for writing.

18. The solid-state drive of claim 12, the plurality of functions performed by the controller further including— changing a memory register containing an access parameter for each speed segment of each memory block to match a ramp rate of the speed segment.

19. A method of implementing high-speed data buffering in a solid-state drive, the solid-state drive including a controller and a non-volatile memory media, the method comprising:

categorizing a plurality of memory blocks of the non-volatile memory media into a plurality of speed categories, wherein a first memory block that is closer to a decoding and sensing circuitry of the controller is faster than a second memory block that is farther from the decoding and sensing circuitry;

dividing each memory block of the plurality of memory blocks into a plurality of speed segments, wherein a first speed segment that is closer to the decoding and sensing circuitry is faster than a second speed segment that is farther from the decoding and sensing circuitry, and wherein the plurality of speed segments include a plurality of wordline segments;

receiving particular data from a host for writing by the controller to the non-volatile memory media;

mapping the particular data to a particular speed segment of a particular memory block based on a speed requirement for accessing the data; and storing the particular data in the particular speed segment of the particular memory block, wherein a data write command for the particular data is issued by the controller for an individual wordline segment of the plurality of wordline segments, and the individual wordline segment is not entirely written as a result of the data write command.

20. A solid-state drive with high-speed data buffering, the solid-state drive comprising:

a non-volatile memory media configured to store data; and a controller configured to perform a plurality of functions including— categorizing a plurality of memory blocks of the non-volatile memory media into a plurality of speed categories, wherein a first memory block that is closer to a decoding and sensing circuitry of the controller is faster than a second memory block that is farther from the decoding and sensing circuitry;

dividing each memory block of the plurality of memory blocks into a plurality of speed segments, wherein a first speed segment that is closer to the decoding and sensing circuitry is faster than a second speed segment that is farther from the decoding and sensing circuitry, and wherein the plurality of speed segments include a plurality of wordline segments and;

receiving particular data from a host for writing by the controller to the non-volatile memory media;

mapping the particular data to a particular speed segment of a particular memory block based on a speed requirement for accessing the data; and storing the particular data in the particular speed segment of the particular memory block, wherein a data write command for the particular data is issued by the controller for an individual wordline segment of the plurality of wordline segments, and the individual wordline segment is not entirely written as a result of the data write command.

* * * * *